United States Patent [19]
Pash

[11] 3,783,731
[45] Jan. 8, 1974

[54] CHROMATIC MULTIPLE STRINGED MUSICAL INSTRUMENT

[76] Inventor: James E. Pash, 1025 W. Gladstone St., La Puente, Calif. 91702

[22] Filed: May 9, 1972

[21] Appl. No.: 251,641

[52] U.S. Cl.................. 84/173, 84/267, 84/293, 84/307, 84/314, 84/485
[51] Int. Cl. ............................................. G10d 1/00
[58] Field of Search..................... 84/173, 267, 290, 84/293, 297, 314, 485, 307

[56] References Cited
UNITED STATES PATENTS

| | | | |
|---|---|---|---|
| 2,449,124 | 9/1948 | Kimmons | 84/267 |
| 1,775,472 | 9/1930 | Ostrovsky | 84/314 |
| 1,636,133 | 7/1927 | Horton | 84/267 |
| 2,550,176 | 4/1951 | Vitovsky | 84/267 X |
| 1,371,506 | 3/1921 | Marx | 84/319 |
| 2,043,121 | 6/1936 | Quemore | 84/173 |
| 3,379,088 | 4/1968 | Fox | 84/485 |
| 3,447,411 | 6/1969 | Bloxsom | 84/270 X |
| 3,525,797 | 8/1970 | Pavia | 84/173 X |

Primary Examiner—Richard B. Wilkinson
Assistant Examiner—Lawrence R. Franklin
Attorney—William E. Ford

[57] ABSTRACT

The disclosure is of a chromatic, multiple stringed, musical instrument having features of conventional banjos, and also features of the sitar of India. As best employed, it comprises a five stringed instrument with each string tightened or loosened to play in any chord. After the strings have been tuned to a chord, a mode is played on a melody string (one of the five).

By arranging the strings in a sequence of gauges and by employing a pitch raising peg means critically with relation to string arrangement it is possible to obtain the effects of playing a chromatic melody with a fixed chord tuning. A conventional sitar type bridge may be used to achieve unique string sound. Also a thumb rest may be provided to aid the manual leverage of the player. With this background instrument, mode-stick sets are provided, selectively to be attached beside the neck of the instrument, the respective mode-sticks being color coded to guide finger manipulation upon the melody string with relation to respective frets, in correspondence with various modes, as for instance, with various international musical scales.

9 Claims, 9 Drawing Figures

PATENTED JAN 8 1974
3,783,731
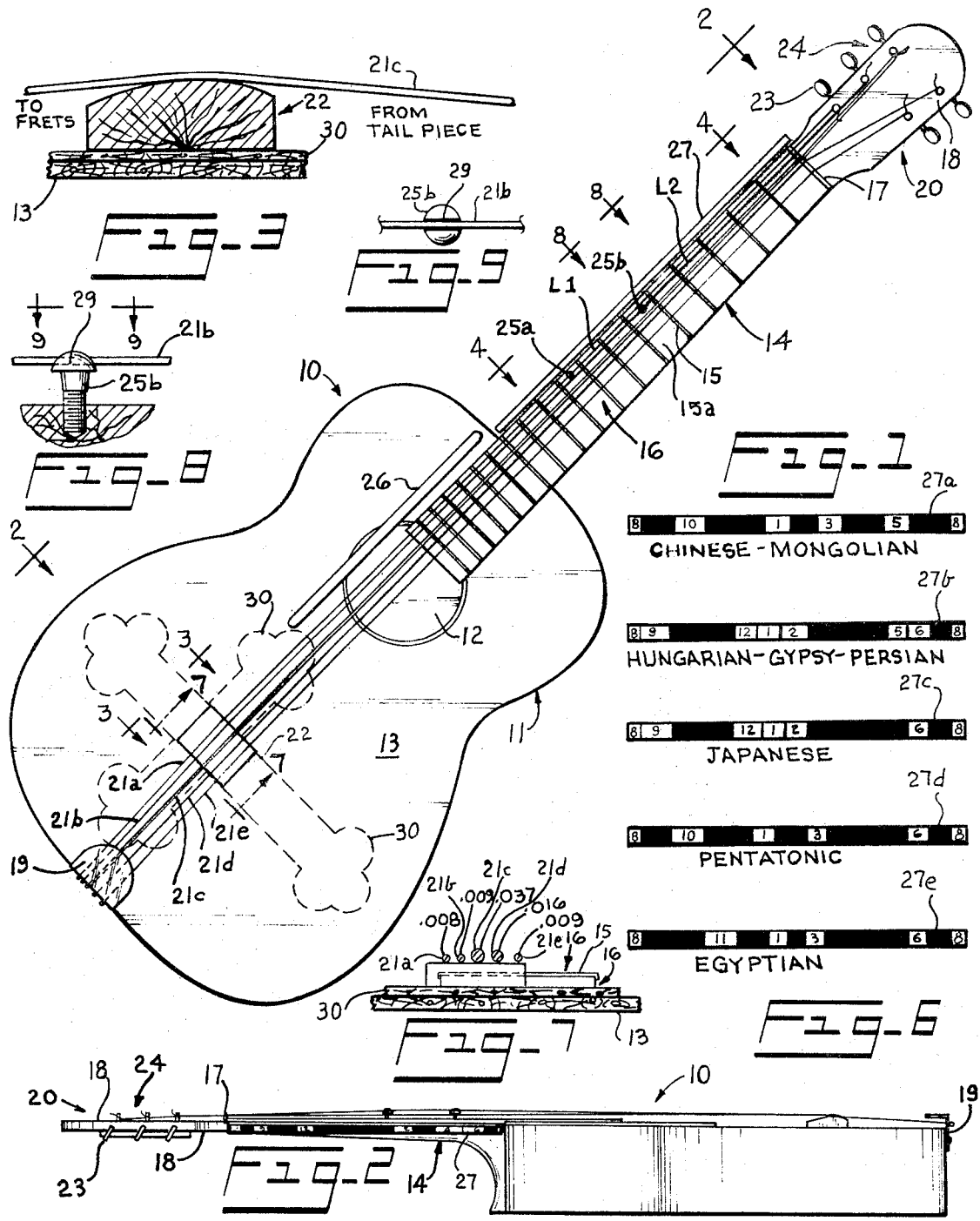
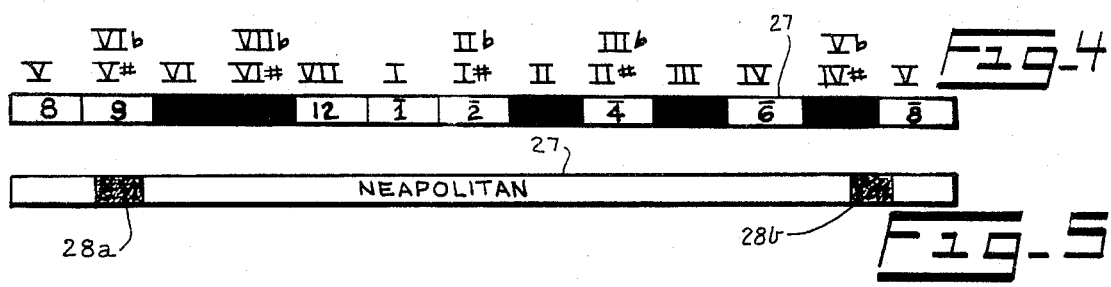

CHROMATIC MULTIPLE STRINGED MUSICAL INSTRUMENT

BACKGROUND OF THE INVENTION

Heretofore, the playing of various instruments as sitars (East Indian), banjos (American), guitars (Western European), kotos (Japanese), and sarods (Afghanistan), has been taught either by teacher demonstration or by written charts. But no all-purpose musical instrument has heretofore been devised, possibly employing some best structural features of the above cited instruments, but comprised of structural features designed to permit the simulation and teaching of selective modes.

A need has existed for an instrument in this general class, for teaching thereon a variety of national, regional, social, historical, period type, and otherwise classifiable modes and/or musical scales. Upon the best knowledge and belief, only one patent remotely related in structure to an instrument of accomplishments hereinabove described, is U.S. Pat. No. 3,422,715, issued Jan. 21, 1969, to V.Gambella et al., Guitar-Like Instrument Bridge. but this patent only teaches the employment of an adjustable sitar type bridge to obtain desirable string sounds.

The invention relates to a novel musical instrument combining features of various instruments, especially features of the sitar of India, and the guitar, whereby developed or ancient drone style musical compositions may be taught, composed or performed.

It is thus a primary object of the invention to provide a novel musical instrument especially combining features of the sitar of India and the guitar, together with features of other stringed instruments, whereby developed or ancient drone style musical compositions may be taught, composed or performed.

It is also an object of this invention to provide an instrument of this class, whereby pitch raising peg means may be employed to give open chord tuning to selective strings, thus to obtain wider range of tuning capability.

It is a further object of this invention to provide an instrument of this class, whereby selective modes may be translated into a coded system in the form of numbered color guides or mode sticks, each indicative of a developed or ancient drone style of music, as "jazz," Scottish dirges, and the like.

It is an additional object of this invention to provide an instrument of this class, whereby the string arrangement, from three to seven strings, preferably of five strings, is of an unusual string sequence in that the sequence proceeds from highest to lowest to middle tonal range.

Other and further objects will be apparent when the specification hereinbelow is considered in connection with drawings and description thereof.

DESCRIPTION OF THE INVENTION

The invention will be further understood from the following description and drawings, wherein:

FIG. 1 is a plan view showing a preferred embodiment of the invention;

FIG. 2 is a longitudinal side elevational view taken along line 2—2 of FIG. 1;

FIG. 3 is a longitudinal cross-sectional view through the bridge of the invention, taken in direction as indicated by line 3—3 in FIG. 1;

FIG. 4 is a side elevational view taken along line 4—4 of FIG. 1, showing the outer, or coded side of a mode stick illustrative, in this case, of characteristic Neopolitan type musical scale, as translated into a numerical scale;

FIG. 5 is a side elevational view of the opposite side or inner face of the mode stick shown in FIG. 4, showing the use of "velcro" as the type of adhesive means whereby the selected NEAPOLITAN type musical scale mode stick may be engaged upon the side of the instrument neck so that the scale may be viewed by the player;

FIG. 6 is a view showing the outer sides of several other mode sticks in respective characteristic type musical scale, as CHINESE-MONGOLIAN, HUNGARIAN-GYPSY-PERSIAN, JAPANESE, PENTATONIC, and EGYPTIAN;

FIG. 7 is a transverse cross-sectional view through the bridge, as taken along line 7—7 of FIG. 1, best to show string spacing and relative diameters.

FIG. 8 is a longitudinal, fragmentary, elevational view, taken along lines 8—8 of FIG. 1; the mode stick being considered removed; and FIG. 9 is a fragmentary plan view, taken along line 9—9 of FIG. 8.

Considering FIG. 1, the instrument 10 employs a conventional guitar type resonating body 11 providing a conventional tone hole or opening 12 in the face 13 thereof. A banjo body or any other musical instrument resonating body may be used as well, but for best demonstrating purpose, a guitar body is disclosed. An elongated neck 14 is shown in FIGS. 1 and 2 as attached to the playing end of the body 11, and such neck is shown divided by frets 15 into a fret board 16; the longitudinally spaced apart frets 15, are shown in accordance with a conventional logarhythmic scale or chromatic pattern.

At the outer end of the fret board 16, a conventional nut 17 is indicated, which upstands above the head 18 of the tuning machine head assembly 20. At the opposite end of the instrument 10, and thus at the opposite end of the resonating body 11, a tail piece 19 is affixed, having aspects of a structural angle. The strings 21a–e, are affixed in predetermined laterally spaced apart relationship, across the tail piece 19, with a preferable spacing: 21a – 21b, one-eighth inch; 21b – 21c, one-fourth inch to one-half inch; 21c – 21d, one-fourth inch to one-half inch; and 21d – 21e, one-fourth inch to one-half inch. The gauges of the strings 21a–e may vary in specific diameters, with generally recommended gauges: 21a, 0.008 inch; 21b, 0.009 inch; 21c, 0.037 inch; 21d, 0.016 inch; and 21e, 0.009 inch.

The strings 21a–e are shown stretched across a bridge 22, with the strings extending from tail-piece 19, over bridge 22, thence with slight clearance (approximately one-eighth inch) over the frets 15, and in contact with the bottoms of conventional slots which extend longitudinally with relation to the instrument, but thus transversely across the narrow nut 17, the slots being spaced apart in accordance with the spacing of the strings 21a–e, as hereinabove set forth. From the nut slots the strings extend to respective spindles of respective mechanism trains, each termed a tuning machine 23, with the complete group of these separate chains of mechanism or trains for adjusting the tension of the respective strings, being designated as the conventional tuning machine assembly 24.

In order to change the effective length of a string, as of the strings 21a and 21b, pitch pegs 25a and 25b are provided in the form of screws threaded into the neck between selective frets 15 of the fret board 16. The string 21a is then lifted up to seat in the slot in the screw head of the pitch peg 25a, thus to neutralize the length L1 of the string 21a from pitch peg 25a to nut 17. In like manner placing the string 21b in the slot in the screw head of the pitch peg 25b thus neutralizes the length L2 of the string 21b from pitch peg 25b to the nut 17. Resultantly the effective tuning lengths of the strings 21a, 21b, are shortened accordingly to respective lengths between bridge 22 and pitch pegs 25a and 25b. This makes it possible for a player to employ a wider range of pitches over the strings employed.

The selective shortening of the effective lengths of the smaller diameter strings 21a, 21b, make it possible for their pitch to be raised far beyond the pitch range obtainable if their full lengths from bridge 22 to nut 17 are the effective lengths employed. Also, as they are struck with index finger of the right hand, they are best disposed relatively to the left to leave freer left hand access to the melody string 21e which is played by all four of the fingers of the left hand which conventionally is disposed with palm upward, under the fret board 16 so the melody playing fingers of the left hand reach to the melody string 21e from the right side of the fret board 16.

A selective rhythmic complement or technique is achieved with the first two strings 21a, 21b, nearest the thumb rest 26, as these strings are struck by transverse index finger motion to reflect rhythm by sounding of the open chord. Noticeably, as these two strings 21a, 21b, are elevated, they are too high to be fingered downwardly against any fret.

Hence, as aforesaid, the rhythm strings 21a, 21b, function at all times in transmitting open chord sounds. These two strings 21a, 21b, are spaced closely together because generally they are struck collectively by one right index finger motion to reflect as a single chord or as a single sound combination. They are struck by a transverse back and forth index finger motion, and are elevated sufficiently by pitch peg contact that they cannot very well be urged downwardly into fret contact. Thus they are strings said to be reflective only of rhythm.

The heavy or large diameter, central, or low drone string 21c, is thus left for most convenient location, as shown in FIGS. 1 and 7, to be struck by the index finger of the right hand in transverse back and forth motion.

The pitch peg contacting, leftwards strings 21a, 21b, are by one technical definition drone strings, in that they are never urged against frets 15, but primarily they serve as rhythm strings and successively thereafter two strings 21c, (heavy), and 21d (medium) are disposed toward the right and as struck by right hand index finger motion, these strings serve successively in low drone and medium drone capacity. Also, these strings 21d, 21c, may be played by left hand finger motion, selectively depressing them into fret contact, to serve as melody strings. Since these two strings thus serve in dual capacities, these are conveniently disposed between the melody string 21e, the right, and the rhythm strings 21b, 21a, successively to the left. Although the medium gauge string 21d could concievably be interchanged in relative positional sequence with the heaviest gauge, or lower drone string 21c, this is not preferable due to the best employment of melody concept, which, to a right handed instrument player, conceives of melody pitch arrangement increasing by lower pitch strings left, high pitch strings right.

On the other hand, the string 21e, employed exclusively for melody, is of light gauge because the pitch of its tuning is at a most preferable pitch, between the high pitch rhythm strings 21a, 21b, and the lower drone and medium drone strings 21c, 21d. This melody string 21e, is most accessible, by virtue of its farthest rightward position, to the fingers of the left hand, which reach over from right to left, from the right side of the fret board 16. The term melody string conventionally implies that the string is selectively depressed at various positions along its length, constantly to change the pitch thereof in correspondence with the respectively positionally disposed fret against which the melody string 21e is selectively brought into contact.

Also, it may be noted in FIG. 1 and in FIG. 7, that the string disposition extends over no more than approximately half the transverse width of the fret board 16. This arrangement is preconceived, and by special design, in that the melody string 21e may be pulled to the right by left hand finger movement, to be urged into contact along the right portion of any fret, thereby changing the *tension* in the melody string 21e, which reflects in raising the pitch, any pitch change caused by effect of infinitesimal change of effective string length being *de minimis*.

As hereinabove set forth, the strings 21d, 21c, being readily and adjacently accessible to the left hand fingers, can be used as much in obtaining a greater range of melody pitch, than in obtaining drone effects. The arrangement of the higher pitch, or middle gauge string 21d, outwardly to the right of the lowest pitch, lowest gauge string 21c, is thus a preferred relative disposition of these two strings 21d, 21c, as a low sounding melody is generally least used artistically.

Having described the structural considerations and arrangement of an exemplary form of the invention, the method of teaching may be considered, which especially involves elongated bars or mode sticks 27 with outer faces or coded sides graduated, as shown in FIG. 4, a Neapolitan type being shown in the illustration. By this designation, Neapolitan type music is represented by translating conventional Western musical notations into a 12 tone number system. The Neapolitans employ particular musical intervals of the conventional Western chromatic scale while neglecting others. Thus, as shown in FIG. 4, the areas for numbers 10 and 11 are shown blacked out, also for 3, 5 and 7, bars over numbers indicating higher octaves. Numbers are employed on these mode sticks in place of exact Western musical interval labels, as A, C # (sharp), D♭ (flat), and the like. This is due to the various tuning possibilities. Rather, the mode stick numbers are equivalent in theory to the Western interval system, as tonic (I), subdominant (IV) and dominant (V). However the system of interval sharp and flat labels, (IIIb, for example), is rejected in favor of using 12 arabic numerals to express the chromatic intervals. By way of illustration, above the coded spaces of the particular Neapolitan type mode stick, as set forth in arabic numeral code, the corresponding Western interval designations are placed in Roman numerals, see FIG. 4. Such is illustrative of the comparative simplification obtainable by using the arabic numeral equivalents.

Mode stick design is shown directed for melody string playing guidance. Although the tuning may be changed, as by tightening or loosening string tension by tuning machine manipulation, nevertheless, the interval characteristics guided by any particularly coded mode stick, retain original scale authenticity.

As shown in FIG. 5, the word NEAPOLITAN is printed on the inner face of the mode stick 27, as installed, this designation serving for direction of selection from a group of diversely designated mode sticks. Various means may be employed to keep a mode stick in desired position along the side of the instrument neck 14, whereby respective code areas are in transverse adjacency with respective fret board areas 15a. An adhesive woven fabric or woven plastic strips 28a, 28b, are indicated near the opposed end of the mode stick 27 shown in FIG. 5. The material of the strips may be designated as made of Velcro. Obviously, other adhesive or removably attaching means may be employed.

FIG. 6 shows a plurality of mode sticks 27a–e, coded in correspondence with the geographical, racial or cultural age applicable, their corresponding type designations being printed thereunder.

FIG. 7 is referred to by way of reiteration, as this accentuates relative string gauge and transverse string spacing, and also, in background, indicates the proportion of the fret board 16 over which strings extend, and the proportion of the fret board left free for melody string left hand finger manipulation.

FIGS. 8 and 9, by way of reiteration, show pitch peg configuration, the pitch peg 25b being shown, as firmly installed in the neck 14, in manner that the conventional slot 29 therein, is parallel with the longitudinal axis of the instrument, thus readily to receive the rhythm string 21b therethrough.

As to the cross pattern 30 shown in dotted lines in FIG. 1, such may be considered in way of design, but also, as indicated in FIG. 3, it spaces the bridge 22 above the upper face of the resonating top 13 of the body 11. Such pattern 30 is not of critical consequence since the bridge 22 may seat directly upon the resonating top 13. As to bridge configuration, the curved or arched shape of the bridge 22, whereby the strings have more than point contact with the bridge, but follow its arched surface for some dimensional extent, results in, at least drone strings having longer and more brilliant tone resonation.

It may be pointed out that the drawings disclose an instrument designed for a right handed player, whereas, for a left handed player, the string sequence and transverse positions may be transversely switched. Consequently the pitch pegs and thumb rest must be switched, and a slight tail piece and bridge shifting also will result. Further whereas a five string arrangement is shown, as few as three strings, (rhythm, drone, melody), may be used, or, as in the Hindu type sitar, as high as seven strings may be employed.

Also, even more than seven strings may be employed in special instruments of this type. However, in all usages and structural arrangements, essentially it is necessary to retain the transverse sequence of high, low and middle pitch ranges of strings. Furthermore, the relative gauge sizes, as in FIGS. 1 and 7 may be transposed within their scopes, as 21b and 21a, and/or 21d with 21c.

With reference to the code, hereinabove described with relation to the mode sticks 27, it is pointed out that the beginning with the numeral 8 at the left end of the mode stick and progressing through the scale to $\overline{8}$ at the right end, is a matter of choice selection. Obviously the beginning and ending number may be other than disclosed.

Pitch pegs 25a and 25b may be omitted and an instrument of this type, minus such pegs, may be provided obtaining high, low and middle pitch ranges. Such an instrument may still comprise an operably novel device, but the provision of the pitch pegs 25a, 25b, measurably increases the tuning potential of the respective strings 21a, 21b.

Additionally it can be seen that a single pitch peg may be provided to be contacted by a plurality of strings, for example two strings through parallel slots, or through a single wide slot. However, such a variation limits the range of tunable pitch potential.

It is also obvious that conventional Roman numeral interval coding may be substituted in lieu of the arabic interval coding shown preferable in FIG. 4, but subject to the hereinabove set forth unfavorable comparison. Also a conventional Western bridge may be employed in place of the special bridge shown in detail transverse configuration in FIG. 3. Further, the mode sticks may be divided into a plurality of parallel extending, longitudinally coded subsections to guide playing of more than one fingerable string of different pitch.

Obviously the construction, arrangements and disclosures of the drawings are by way of example and suggestion, and do not place limitations on the broad spirit of the invention.

I claim:

1. The combination of a guitar-shaped musical instrument comprising successively along the longitudinal axis thereof, a tail piece supported on a resonating body, a longitudinally arched bridge of predetermined height supported upon the body and spaced from the tail piece, an elongated neck comprising a chromatic fret board extending longitudinally centrally from the body end portion opposite the tail piece, and co-axially of said body, said neck carrying a nut outwardly of the fret board, and said nut having a plurality of longitudinally extending, transversely spaced apart notches therein, said neck terminating outwardly of said nut in a tuning machine, a plurality of strings stretched from said tail piece to pass in arcuate contact over the central portion of said bridge arch and passing over said frets in transversely spaced apart relationship above substantially half the fret board width, and selectively through said notches to selective tuning machine string post to be adjustably tightened in tension by the respective tuning gear means therefor, said strings being arranged transversely successively from highest, smallest fractional inch cross-section diameter, to lowest, largest fractional inch diameter, to middle fractional inch diameter, tone range, with middle tone range string disposition being over transverse area bordering the transverse area over the unused fret board portion, said guitar-shaped musical instrument providing fret board mounted pitch peg means with head elevation above, and grooved longitudinally as disposed, for slight lift of highest tonal string disposition, with pitch peg means position at pre-selected distance from nut, whereby to raise highest tonal string pitch range capability.

2. A musical instrument, as claimed in claim 1, which additionally provides for the selectively removably positioning of mode sticks, one at a time, on the side surface of the neck adjacent said pitch peg means, mode stick coding being in correspondence with selective race-area-style modes.

3. A musical instrument as claimed in claim 1, which includes a thumb rest on said body, extending beside the rhythm string side of said fretboard.

4. A musical instrument as claimed in claim 1 which additionally includes race-area-mode stick means chromatically coded for outwardly facing, with mode stick disposition at predetermined position along the side of said elongated neck facing the player and with relation to said fret board, additional means also being included for removable mode stick means positioning on said neck.

5. A musical instrument as claimed in claim 4, in which said mode stick means comprises a plurality of mode sticks in a set, selectively chromatically coded representative of class, race, period, type characteristically, with a mode stick, as selectively installed, one at a time, on said elongated neck, disposing the chromatically coded scale thereof, with relation to said fret board, to guide a player in string manipulation in correspondence with the mode stick scale facing him.

6. A musical instrument as claimed in claim 4, in which said mode stick means oppositely of chromatic code facing, present adhesive means for mode stick means removable positioning at predetermined position upon said neck.

7. A musical instrument as claimed in claim 1 in which highest tone range comprises two rhythm strings, in which lowest tone range comprises two drone strings, and in which middle tone range comprises at least one melody string, an adjacent drone string also serving as additional melody string.

8. A musical instrument as claimed in claim 7, in which said strings, successively from left to right, as viewed looking toward said tuning machine, are of substantially gage sizes 0.008 inch, 0.009 inch, 0.037 inch, 0.016 inch and 0.009 inch.

9. A musical instrument as claimed in claim 1, in which said bridge, of sitar type, is arched, as viewed sidewardly, to provide longer string contact therewith.

* * * * *